Dec. 7, 1965   A. DENIS ETAL   3,222,593
MEASURING THE CHARACTERISTICS OF A MAGNETIC FIELD
AT ANY GIVEN POINT BY NUCLEAR RESONANCE
Filed July 13, 1962
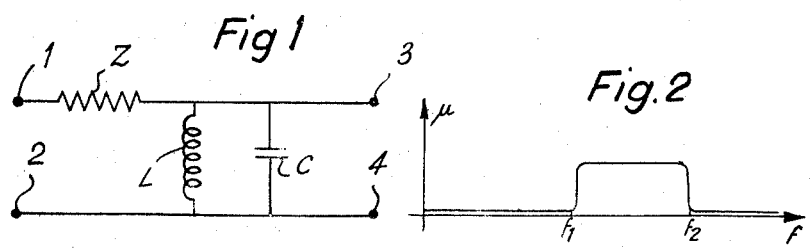
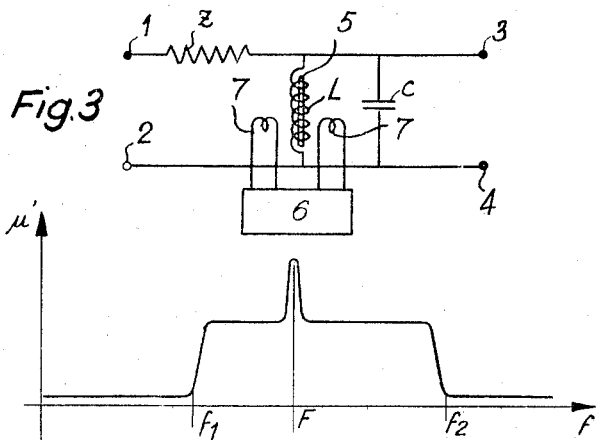
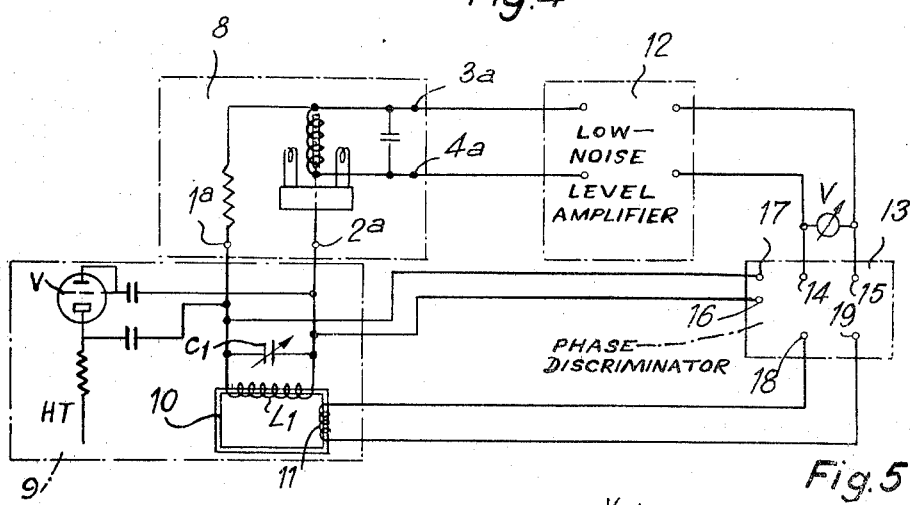
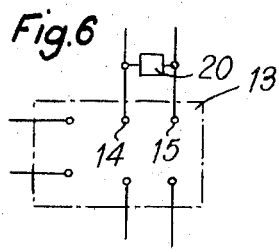
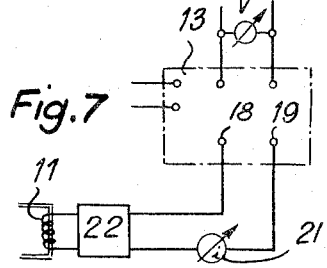

United States Patent Office 3,222,593
Patented Dec. 7, 1965

3,222,593
MEASURING THE CHARACTERISTICS OF A MAGNETIC FIELD AT ANY GIVEN POINT BY NUCLEAR RESONANCE
André Denis, Herblay, and Guy Ripart, Plessis-Robinson, France, assignors to Sud-Aviation Société Nationale de Constructions Aéronautiques, Paris, France
Filed July 13, 1962, Ser. No. 209,540
Claims priority, application France, July 13, 1961, 867,872; Patent 1,303,505
5 Claims. (Cl. 324—.5)

This invention relates to improvements for measuring, by nuclear resonance, such characteristics of a magnetic field as its absolute magnitude or its variations at any given point.

Such determinations are usually based on the frequency at the middle of an intense and narrow nuclear magnetic resonance line. As is well known, the frequency F, or the Larmor precession frequency, of a nuclear spin placed in a magnetic field H is related to the latter by the equation:

$$F = \gamma \frac{H}{2\pi} \tag{1}$$

where $\gamma$ is a coefficient characterizing the nuclear spin the resonance of which is being observed, said coefficient being known with great accuracy and being termed the gyromagnetic ratio of the proton.

In conventional apparatus used for such determinations, an exploration sample consisting of a volume of liquid containing the nuclei of which the nuclear resonance is to be observed is disposed within the coil of a resonant circuit placed in the magnetic field to be measured, said sample being subjected to a field of high frequency tuned to the electronic resonance frequency of the substance, with a view to obtaining a very fine line of great amplitude representing the energy by the corresponding nuclear spins into the surrounding magnetic field. This phenomenon is known as the Overhauser effect.

In order to obtain a relatively strong continuous signal of frequency equal to that of the resonance defined by Formula (1), recourse has already been had to a resonant circuit having a very high overvoltage coefficient. The impossibility in practice of exceeding certain limits has led experimenters to artificially increase the overvoltage of this circuit by a positive feedback, by means of an amplifier. However, this artifice has the dual disadvantage of making it difficult to proportion the feedback and also of causing a frequency drift when a slight mismatching exists between the nuclear resonance frequency and the frequency of the resonant circuit.

With a view to overcoming these drawbacks, this invention has for an object to provide apparatus for determining, by nuclear resonance, the characteristics of a magnetic field at any given point, by injecting a signal of adjustable frequency close to that of the natural signal of the oscillating circuit into a selective oscillating circuit disposed at said point and excited by nuclei subjected to the Overhauser effect, generating a current which is a function of the phase shift between these two signals, adjusting said adjustable frequency by said current with a view to cancelling the difference between said two frequencies in order to increase the intensity of the emission from said oscillating circuit, and determining separately or not, the absolute magnitude and the variations of said field at said points, respectively by measuring the frequency of said emission, which is then equal to the Larmor precession frequency of said nuclei and consequently proportional to said absolute magnitude, and by studying the variations of said current, which are proportional to the variations of said field.

In accordance with one specific embodiment of apparatus according to the invention, said adjustable frequency is feedback controlled by the nuclear resonance frequency of the nuclei.

In accordance with another form of embodiment of the invention, a measurement is made of the voltage of the signals emitted by said oscillating circuit, said voltage following the amplitude fluctuations of the nuclear magnetic resonance line of said nuclei.

It is a further object of this invention to provide an apparatus for measuring the characteristics of a magnetic field at a given point, whereby the operation disclosed hereinabove may be carried into practice, said apparatus being of the type comprising a probe which consists, in the manner well known per se, of a sample containing nuclei subjected to the Overhauser effect and disposed within the coil of a selective or LC oscillating circuit, characterized in that said probe is loosely coupled to an adjustable frequency oscillator which is connected, together with said oscillating circuit, to a phase discriminator, the apparatus further comprising means sensitive to the output current from said discriminator to so vary the frequency of said oscillator to tend to cancel the difference between said frequency and the Larmor precession frequency of said nuclei, said apparatus further comprising either a frequency meter connected to the probe output, or a voltmeter connected to the output of said probe, or a device for analysing said current, or several or all of these instruments at once.

The adjustable frequency oscillator is preferably a self-oscillator feedback controlled by the direct current furnished by the phase discriminator.

The description which follows with reference to the accompanying drawings, which are filed by way of example and not of limitation, will give a clear understanding of how the invention may be carried into practice and will disclose yet further particularities thereof.

In the drawings:

FIG. 1 represents a conventional selective oscillating circuit.

FIG. 2 schematically shows the curve obtained when the output voltage from the selective oscillating circuit of FIG. 1 is plotted against the input frequency into said circuit.

FIG. 3 is the wiring diagram of a probe for studying the magnetic field by nuclear resonance, said probe being associated to the selective circuit of FIG. 1.

FIG. 4 schematically shows the curve of voltage plotted against frequency, in the case of the probe of FIG. 3.

FIG. 5 is the wiring diagram of a device for measuring the characteristics of a magnetic field by nuclear resonance in accordance with this invention, said device being equipped with a voltmeter for studying amplitude variations in the nuclear resonance line.

FIGS. 6 and 7 illustrate portions of the device shown in FIG. 5, which portions are respectively equipped with a frequency meter for measuring the nuclear resonance frequency and with an ammeter for studying variations in the current through the slaving circuit.

Referring now to FIG. 1, if the selective or LC circuit schematically illustrated thereon by a self-induction coil L and a capacitor C be energized through a coupling impedance $z$ acting as a weakly coupling means, then a four-pole system, having input terminals 1 and 2 and output terminals 3 and 4, will be constituted. When the frequency $f$ across the input terminals 1 and 2 varies, the four-pole system output voltage $\mu$ will vary in obedience to a law which is illustrated schematically in FIG. 2 and which characterizes the pass-band $f_1 - f_2$ of the selective circuit in FIG. 1.

If now, as shown in FIG. 3, there is introduced into the coil L of FIG. 1 a vessel 5 containing water which is doped or not with a paramagnetic substance, and if, furthermore, this water is subjected to a high frequency field which is tuned to the electronic resonance frequency of the said paramagnetic substance or of the nondoped water and which is obtained by a generator 6 energizing coils 7 set perpendicularly across both the self-induction coil L and the magnetic field H which is perpendicular to the plane of the figure, it will be found that the output voltage $\mu'$ of the four-pole system can be represented by the curve in FIG. 4. For a given value F of the input frequency given by Equation (1), a very fine line of large amplitude appears, corresponding to an emission of energy into the surrounding magnetic field H by the nuclear spins of the water, known as the Overhauser-Abragam effect. The LC circuit gives the phase coherency for the signals delivered by the proton probe illustrated in FIG. 3.

If the phases of the input and output voltages of the four-pole system of FIG. 3 be compared when the supply input frequency $f$ varies about the nuclear resonance frequency F, then, as a first approximation, the phase difference $\rho$ will vary linearly with said input frequency $f$, so that if the origin be correctly chosen, one may write:

$$\rho = A(f-F) \qquad (2)$$

where A is a constant.

It is of this specific property that advantage is taken in the present invention for executing a practical apparatus whereby the nuclear frequencies F may be measured and, on the basis thereof, the ambient magnetic fields ascertained from relation (1).

This phase difference is converted by means of a phase discriminator into a direct current the value of which is proportional to said difference, and the direct current produced in this manner is used to so control the frequency of auxiliary signals delivered by an adjustable frequency self-oscillator that said frequency be made by natural drift to coincide with Larmor's frequency F and that automatic lock-on be ensured in the event of a deviation therefrom.

To this end, and as is clearly represented in FIG. 5, the apparatus for measuring the characteristics of a magnetic field at a given point by nuclear resonance comprises a probe 8 consisting of the selective circuit of FIG. 3, the component parts of which circuit bear the same reference numerals as those used in FIG. 3 followed by the subscript $a$, while a self-oscillator 9 of adjustable frequency has its output connected to the input terminals $1a$ and $2a$ of said probe in order to submit the LC circuit to a constrained oscillation. Said adjustable frequency self-oscillator is equipped with a value V and with a resonant element comprising a self-induction coil $L_1$ with a saturatable core 10 and a saturation winding 11, in conjunction with an adjustable tuning capacitor $C_1$.

The apparatus further comprises a low-noise-level amplifier 12 connected to the outputs $3a$ and $4a$ of probe 8 and a phase discriminator 13 into which are injected the output voltage from said amplifier 12 through the terminals 14 and 15 and the output voltage from self-oscillator 9 through the terminals 16 and 17. The output terminals 18 and 19 of said phase discriminator are connected to the saturation winding 11 of self-oscillator 9. In such an oscillator, or other equivalent oscillator, the generated frequency $f$ varies in terms of the direct current $i$ delivered by the phase discriminator 13 and flowing through the element 11 or its equivalent; in fact, the self-oscillator 9 is feedback controlled by said D.C. The truth of the reasoning which follows is in no way invalidated by assuming that such variations are, as a first approximation, linear over a limited range and take the form:

$$f = f_0 + Bi \qquad (3)$$

where $f_0$ is the natural frequency of the oscillating circuit $L_1 C_1$ and B is a constant.

The phase discriminator 13, as is well known, supplies across its output terminals 18 and 19 a direct current which is a function of the phase difference existing between voltages injected through 14–15 and through 16–17 respectively. Again in the interest of clarity, it will be assumed that this relation is linear, at any rate over a certain range. One may, therefore, write:

$$i = C\rho \qquad (4)$$

where C is a constant.

The combination of relations (2), (3) and (4) gives:

$$f - f_0 = BCA(f - F)$$

or $$f - F = \frac{f - f_0}{ABC} \qquad (5)$$

where A, B, C are constants stemming from the size of the apparatus and B and C in particular can be made very large.

Since the value $(f-f_0)$ is necessarily finite, it may be seen that the value $(f-F)$ can be made as small as desired until the following equality is obtained.

$$f = F \qquad (6)$$

This equality is achieved automatically by the apparatus according to this invention, regardless of whether F varies subsequently for any reason.

In this way there are provided, at the output of amplifier 12, signals the frequency of which is the same as that of the resonance line, and this frequency will follow, without any need for adjustment, such variations in said nuclear resonance frequency as are caused by the variations, rapid though they may be, of the magnetic field H to be measured.

It is easy, therefore, to appreciate both the aim and the usefulness of the present invention, which consists in providing an adjustable frequency apparatus that is caused to lock onto the nuclear magnetic resonance frequency.

It will easily be seen that the various relations given hereinabove will be valid only over a fairly limited frequency range and that the automatic lock-on will operate correctly only if the system has first been approximated to a sufficient degree. For this reason, provision is made for the self-oscillator 9 to be tunable by means of the adjustable capacitor $C_1$. Such tuning can be carried out manually, in approximate fashion, to within 4 cycles, say. To this end, the voltmeter V connected across terminals 14 and 15 is kept under observation. As soon as the approximate frequency $f_a$ enters the regulation range of discriminator 13, the frequency jumps automatically to the frequency F and the reading given by voltmeter V immediately shows a substantial increase.

Thenceforward, if the nuclear magnetic resonance frequency F varies as a function of some variation in the magnetic field, the apparatus hereinbefore described ensures that the output frequency from amplifier 12 remains equal to this varying frequency.

The apparatus as illustrated in FIG. 5 can be operated in either of the three following different ways:

(a) As shown in FIG. 6, a frequency meter 20 is connected across the terminals of amplifier 12 and said frequency meter indicates the output frequency of said amplifier, i.e. the nuclear magnetic resonance or Larmor precession frequency of the nuclei utilized, on the basis of which frequency the absolute magnitude of the magnetic field H can be determined with the desired degree of accuracy by applying the relation (1).

(b) From readings on the voltmeter V of FIG. 5 or from recordings on a recording device utilized in lieu thereof, a study is made of the voltage fluctuations across the output terminals of amplifier 12, with a view to following the amplitude variations in the nuclear resonance line.

(c) From direct readings, or from recordings by means of an instrument 21 such as an ammeter inserted into the slaving circuit (see FIG. 7), a study is made of the current $i$ which flows across terminals 18 and 19 of phase discriminator 13 and which represents a characteristic feature of the variance in the magnetic field H, the fluctuations in said current flow providing an indication which remains proportional to the fluctuations in said magnetic field into which the probe is placed, which indication is utilized for detecting said fluctuations.

This latter method of operation can be further improved by introducing into the feedback-controlling circuit which connects the phase discriminator 13 and the saturation winding 11 a circuit 22 having an appreciable time-constant. With such an arrangement, slow changes in the magnetic field H will produce variations in the current $i$ that are likewise slow. Conversely, any rapid variation in said field will generate a very strong signal which the continuous recording process accomplished by the device 21 will detect immediately.

It is to be noted that the method and apparatus according to this invention allow for the use of a low frequency source that does not call for any special stability conditions for the obtainment of a nuclear resonance line capable of following the variations, rapid notwithstanding, of the magnetic field to be measured, without the need for manual adjustment. The measurement of said magnetic field can consequently be accomplished with very great accuracy by measuring the frequency of the output signal from the low-noise-level amplifier, without causing any frequency drift.

What we claim is:

1. In an apparatus for measuring the strength of a magnetic field at a given point, of the type comprising a conventional proton probe consisting of a proton sample subjected to an Overhauser effect and surrounded by the coil of an L.C. circuit, said coil being weakly coupled to a self-oscillator which is connected to a phase discriminator to which is also connected said self-oscillator by a low-noise level amplifier whereby the phase discriminator generates a direct current which is a function of the phase difference between the signals delivered by said amplifier and by said oscillator, means connected to said self-oscillator and to said phase discriminator for feedback controlling said self-oscillator by said direct current to cancel said phase difference, and means for measuring the frequency of the signals delivered by said amplifier in order to determine the strength of the magnetic field, the improvement according to which the self-oscillator has a resonant element comprising a saturatable core, a self-induction coil wound on said core, an adjustable tuning capacitor connected in parallel across said self-induction coil and a saturation winding wound on said core, the means for feedback controlling the self-oscillator comprising a feedback controlling circuit interconnecting the output of the phase discriminator and said saturation winding, whereby said winding and said circuit act as a feedback control for said self-oscillator.

2. An apparatus according to claim 1, further comprising a voltmeter mounted in parallel between the low-noise level amplifier and the phase discriminator in order to detect the amplitude variations in the nuclear resonance.

3. An apparatus according to claim 1, further comprising a current value sensitive means mounted in series in the feedback controlling circuit for indicating the variations of the direct current in order to detect the fluctuations of the magnetic field.

4. An apparatus according to claim 3, further comprising a circuit having an appreciable time-constant interconnecting the current value sensitive means and the saturation winding, whereby the correction of the self-oscillator frequency is delayed for obtaining a better detection of the magnetic field fluctuations.

5. In an apparatus for measuring the strength of a magnetic field at a given point, of the type comprising a conventional proton probe consisting of a proton sample subjected to an Overhauser effect and surrounded by the coil of an LC circuit; the improvement comprising, in combination, a self-oscillator having a resonant element comprising a saturatable core, a self-induction coil wound on said core, an adjustable tuning capacitor connected in parallel across said self-induction coil and a saturation winding wound on said core; a coupling impedance interconnecting the output of said self-oscillator and the input of the coil of the LC circuit, a low-noise level amplifier connected to the output of the proton probe, a phase discriminator having two inputs respectively connected to the outputs of said self-oscillator and of said amplifier for generating a direct current which is a function of the phase difference between the signals delivered by said amplifier and by said oscillator, a feedback controlling circuit interconnecting the output of the phase discriminator and said saturation winding, whereby said winding and said circuit act as a feedback control for said self-oscillator; a frequency meter and a voltmeter respectively mounted in parallel between the low-noise level amplifier and the phase discriminator, an ammeter mounted in series in said feedback controlling circuit, and a circuit having an appreciable time-constant mounted in parallel across said feedback controlling circuit between said ammeter and said saturation winding.

References Cited by the Examiner

UNITED STATES PATENTS

| 2,922,947 | 1/1960 | Bloom et al. | 324—0.5 |
| 3,049,662 | 8/1962 | Abragram et al. | 324—0.5 |
| 3,103,624 | 9/1963 | Greenwood et al. | 324—0.5 |
| 3,127,556 | 3/1964 | Gielow et al. | 324—5 |

OTHER REFERENCES

Bekeshko et al., The Physics of Metals and Metallography, vol. 6, No. 4, 1958, pages 30–34 inclusive.

Feldman, Review of Scientific Instruments, vol. 31, No. 1, January 1960, page 72.

Noble et al., Review of Scientific Instruments, vol. 28, No. 11, November 1957, pp. 930–932 incl.

Shulman, Physical Review, vol. 121, No. 1, Jan. 1, 1961, article commencing on page 125, pp. 125–128 incl.

CHESTER L. JUSTUS, *Primary Examiner.*

MAYNARD R. WILBUR, *Examiner.*